US012580620B2

(12) United States Patent
Sun et al.

(10) Patent No.:    US 12,580,620 B2
(45) Date of Patent:        Mar. 17, 2026

(54) UE CAPABILITY-BASED CSI REPORT CONFIGURATION

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Dietmar Gradl, Ebersberg (DE); Hong He, San Jose, CA (US); Hongbo Yan, Vista, CA (US); Ismael Gutierrez Gonzalez, San Jose, CA (US); Sigen Ye, Whitehouse Station, NJ (US); Wei Zeng, Saratoga, CA (US); Yushu Zhang, Beijing (CN); Ziyang Ju, Munich (DE)

(73) Assignee: Apple Inc., Cupertino, CA (US)

( * ) Notice: Subject to any disclaimer, the term of this patent is extended or adjusted under 35 U.S.C. 154(b) by 660 days.

(21) Appl. No.: 17/593,596

(22) PCT Filed: Oct. 14, 2020

(86) PCT No.: PCT/CN2020/120909
§ 371 (c)(1),
(2) Date: Sep. 21, 2021

(87) PCT Pub. No.: WO2022/077272
PCT Pub. Date: Apr. 21, 2022

(65) Prior Publication Data
US 2022/0302977 A1        Sep. 22, 2022

(51) Int. Cl.
*H04W 76/28*        (2018.01)
*H04B 7/0417*        (2017.01)
*H04B 7/06*        (2006.01)

(52) U.S. Cl.
CPC ......... *H04B 7/0626* (2013.01); *H04B 7/0417* (2013.01); *H04B 7/0632* (2013.01); *H04B 7/0639* (2013.01); *H04W 76/28* (2018.02)

(58) Field of Classification Search
CPC .................................................. H04B 7/0632
See application file for complete search history.

(56) References Cited

U.S. PATENT DOCUMENTS

2018/0076865 A1    3/2018  Nammi et al.
2018/0145737 A1    5/2018  Rahman et al.
(Continued)

FOREIGN PATENT DOCUMENTS

CN        104584663        4/2015
CN        108322243        7/2018
(Continued)

OTHER PUBLICATIONS

3GPP TS 38.214 version 16.2.0 Release 16 (Year: 2020).*
(Continued)

*Primary Examiner* — Pamit Kaur
(74) *Attorney, Agent, or Firm* — Fay Kaplun & Marcin, LLP

(57)        ABSTRACT

A user equipment (UE) is configured to report capabilities to as network. The UE transmits UE capabilities for channel state information (CSI) reporting to a base station, wherein the UE capabilities include a CSI-RS-resource-indicator (CRI)-rank indicator(RI)-channel quality indicator (CQI) reporting capability and a further CRI-RI-CQI reporting capability and receives a CSI report configuration from the base station, wherein the CSI report configuration is based on the UE capabilities.

16 Claims, 5 Drawing Sheets

Method 400

Start

Transmit cri-RI-CQI capability — 405

Report maximum number of configurable CSI-RS resources for non-PMI-PortIndication based cri-RI-CQI report — 410

Report maximum number of MIMO layers supported — 415

Receive CSI Report configuration — 420

End

(56) References Cited

U.S. PATENT DOCUMENTS

| | | | | |
|---|---|---|---|---|
| 2019/0082435 A1* | 3/2019 | Noh | .................... | H03M 13/13 |
| 2019/0158155 A1* | 5/2019 | Park | ................... | H04B 7/0417 |
| 2019/0260448 A1* | 8/2019 | Rahman | ............. | H04B 7/0632 |
| 2021/0345399 A1* | 11/2021 | Levy | ................... | H04L 5/0073 |

FOREIGN PATENT DOCUMENTS

| | | |
|---|---|---|
| CN | 110875812 | 3/2020 |
| CN | 110999106 | 4/2020 |
| EP | 3522390 | 8/2019 |
| WO | 2018/226581 | 12/2018 |

OTHER PUBLICATIONS

Ericsson, "Clarfication for CSI-RS measurement in DRX", 3GPP TSG-RAN WG1 Meeting #98bis, R1-1911253, Oct. 20, 2019, 2 sheets.

Nokia et al., "On the CRI Definition and Usability in NR", 3GPP TSG-RAN WG1 #89, R1-1708918, May 19, 2017, 4 sheets.

Zte, "On UE Adaptation to Maximum Number of MIMO Layer", 3GPP TSG RAN WG1 #99, R1- 1911927, Nov. 22, 2019, 4 sheets.

Anritsu, "Correction to FR1 aperiodic subband CQI reporting under fading conditions", 3GPP TSG-RAN5 Meeting #87-e, R5-202737, Jun. 2, 2020, 17 sheets.

\* cited by examiner

Method 400

UE CAPABILITY-BASED CSI REPORT CONFIGURATION

BACKGROUND

In 5G new radio (NR) wireless communications, the 5G NR network may assign one or more frequency sub-bands to a user equipment (UE) to exchange information with the network. These sub-bands are allocated to the UE based on measured channel conditions that the UE reports to a next generation NodeB (gNB) of the network based on channel state information (CSI) measurements conducted by the UE on a CSI reference signal (CSI-RS). Two categories of CSI reports are link adaptation (LA) CSI reports that primarily focus on digital precoding, and beam management (BM) CSI reports that primarily focus on analog precoding. There are currently six codebook types for LA CSI reports: (1) Release-15 (Rel-15) Type I Single Panel, (2) Rel-15 Type I Multi-Panel, (3) Rel-15 Type II, (4) Rel-15 Type II Port Selection, (5) Rel-16 enhanced Type (eType) II, and (6) Rel-16 eType II Port Selection. In addition, LA CSI reports also include CSI-RS resource indicator-rank indicator-channel quality indicator (cri-RI-CQI) reports.

SUMMARY

Some exemplary embodiments are related to a processor configured to perform operations. The operations include transmitting UE capabilities for channel state information (CSI) reporting to a base station, wherein the UE capabilities include a CSI-RS-resource-indicator(CRI)-rank indicator (RI)-channel quality indicator (CQI) reporting capability and a further CRI-RI-CQI reporting capability and receiving a CSI report configuration from the base station, wherein the CSI report configuration is based on the UE capabilities.

Other exemplary embodiments are related to a processor configured to perform operations. The operations include entering a discontinuous reception (DRX) active time period, determining whether channel state information (CSI) resources were received during the DRX active time period and when CSI resources were received during the DRX active time period, determining whether to perform CSI measurements during the DRX active time period based on the received CSI resources.

Still further exemplary embodiments are related to a processor configured to perform operations. The operations include receiving one of a first restriction from a base station regarding a precoding matrix indicator (PMI) codebook rank or a second restriction from the base station regarding one or more PMI codebook values and reporting a PMI value to the base station based on at least one of the first restriction or the second restriction.

DETAILED DESCRIPTION

Figure 1:
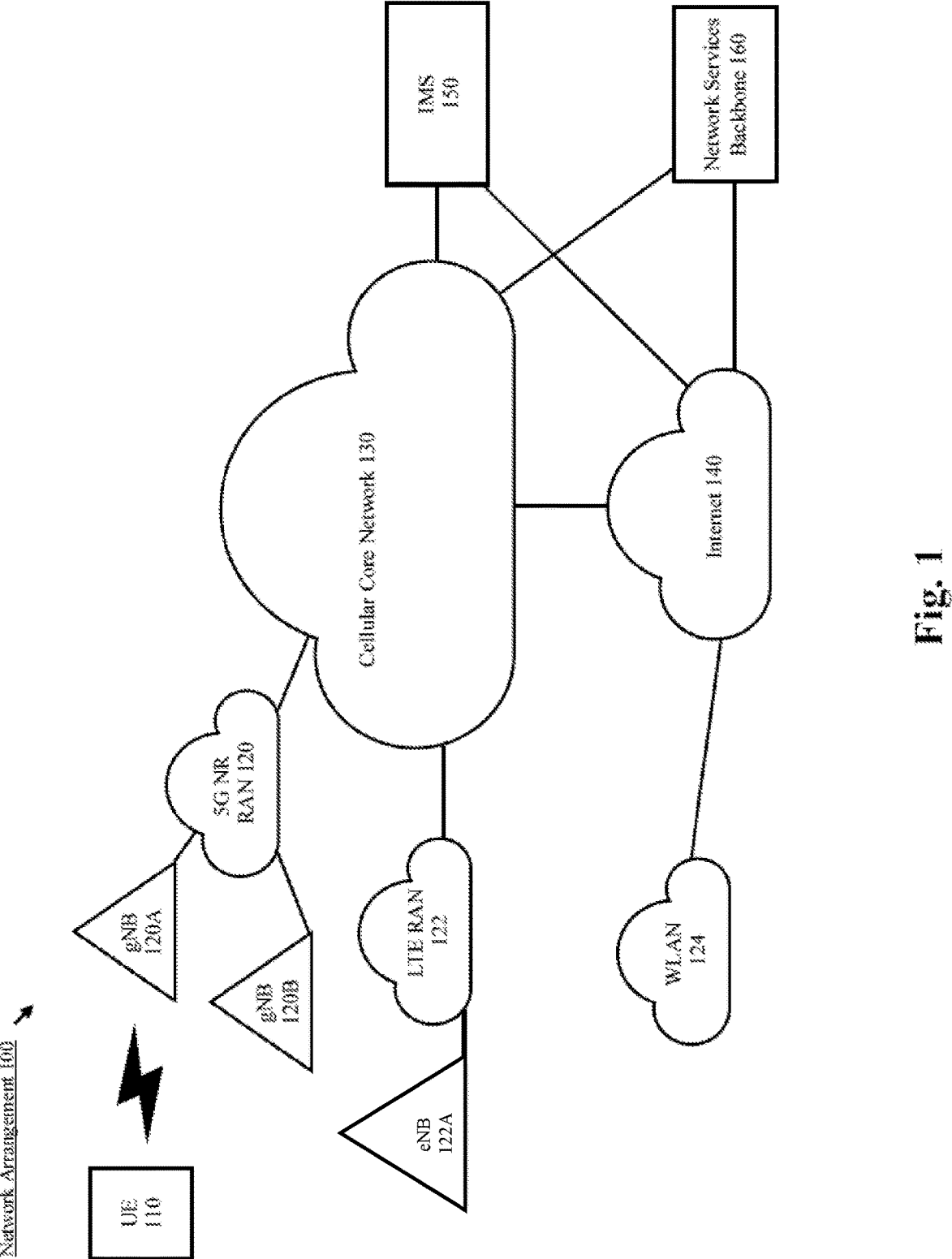
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe a device, system and method for a next generation NodeB (gNB) of a 5G new radio (NR) network to configure a CSI report configuration based on a user equipment (UE) capability reported by the UE.

The exemplary embodiments are described with regard to a network that includes 5G new radio NR radio access technology (RAT). However, the exemplary embodiments may be implemented in other types of networks using the principles described herein.

The exemplary embodiments are also described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

As noted above, one type of CSI report is the cri-RI-CQI report. There are two categories of cri-RI-CQI reports. The first is the cri-RI-CQI report with non-PMI-PortIndication and the second is the cri-RI-CQI report without non-PMI-PortIndication. These two categories of cri-RI-CQI reports are defined in 3GPP technical specification (TS) 38.214 section 5.2.1.4.2. The cri-RI-CQI with non-PMI-PortIndication may provide the gNB with more flexibility in terms of configuring the port combination that the UE can report. However, processing this report requires significantly more memory at the UE than the cri-RI-CQI without non-PMI-PortIndication report because when non-PMI-PortIndication is configured, the port selection for every rank is configured by the gNB for each resource. In current 5G NR networks, if the UE supports cri-RI-CQI reporting, then the UE must support both types of cri-RI-CQI reporting. It would be beneficial to reduce the memory requirements at the UE side while maintaining the UE's capability to support cri-RI-CQI reporting.

According to some exemplary embodiments, when the UE reports support for cri-RI-CQI reporting, the UE additionally indicates whether or not non-PMI-PortIndication based cri-RI-CQI reporting is supported. As such, the UE may indicate support for the less memory-intensive cri-RI-CQI without non-PMI-PortIndication report but not the cri-RI-CQI with non-PMI-PortIndication report.

Two types of resources configured by the gNB for UE measurement for a CSI report are the channel measurement resources (CMR) and interference measurement resources (IMR). When the power saving connected mode discontinuous reception (CDRX) is configured for a UE, the UE may receive the CMR or IMR during one DRX active time period and the other of the CMR or IMR during another active DRX time period. The result of this behavior is that the UE will store the CMR or IMR measurements from the first active DRX time period until it receives and performs the measurements with the other during another active DRX time period. As such, memory at the UE is not being utilized efficiently.

According to some exemplary embodiments, the UE is not expected to handle the above-mentioned scenario in which the UE receives the CMR in one active DRX time period and the IMR in another active DRX time period.

Instead, the UE may report the CSI based on measurements during a DRX active time period in which both the CMR and IMR have both been received.

In current 5G NR network design, for Type I codebook with two transmission antenna ports at the gNB (2 port NZP-CSI-RS as CMR), the gNB may configure both a twoTX-CodebookSubsetRestriction, as defined in 3GPP TS 38.214, and a typeI-SinglePanel-ri-Restriction, as defined in 3GPP TS 38.331, to restrict which precoding matrix indicator (PMI) can be selected by the UE from the Rel-15 Type I Single Panel codebook defined in 3GPP TS 38.214. However, there are scenarios when these two restriction methods may conflict.

According to some exemplary embodiments, when the gNB configures both the twoTXCodebookSubsetRestriction and the typeI-SinglePanel-ri-Restriction, the UE may either ignore one of these methods or may honor both restrictions in case a conflict arises.

FIG. 1 shows an exemplary network arrangement 100 according to various exemplary embodiments. The exemplary network arrangement 100 includes a UE 110. It should be noted that any number of UEs may be used in the network arrangement 100. Those skilled in the art will understand that the UE 110 may alternatively be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. During operation, the UE 110 may be within range of a plurality of gNBs. Thus, either simultaneously or alternatively, the UE 110 may connect to the 5G NR-RAN 120 via the gNBs 120A and 120B. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
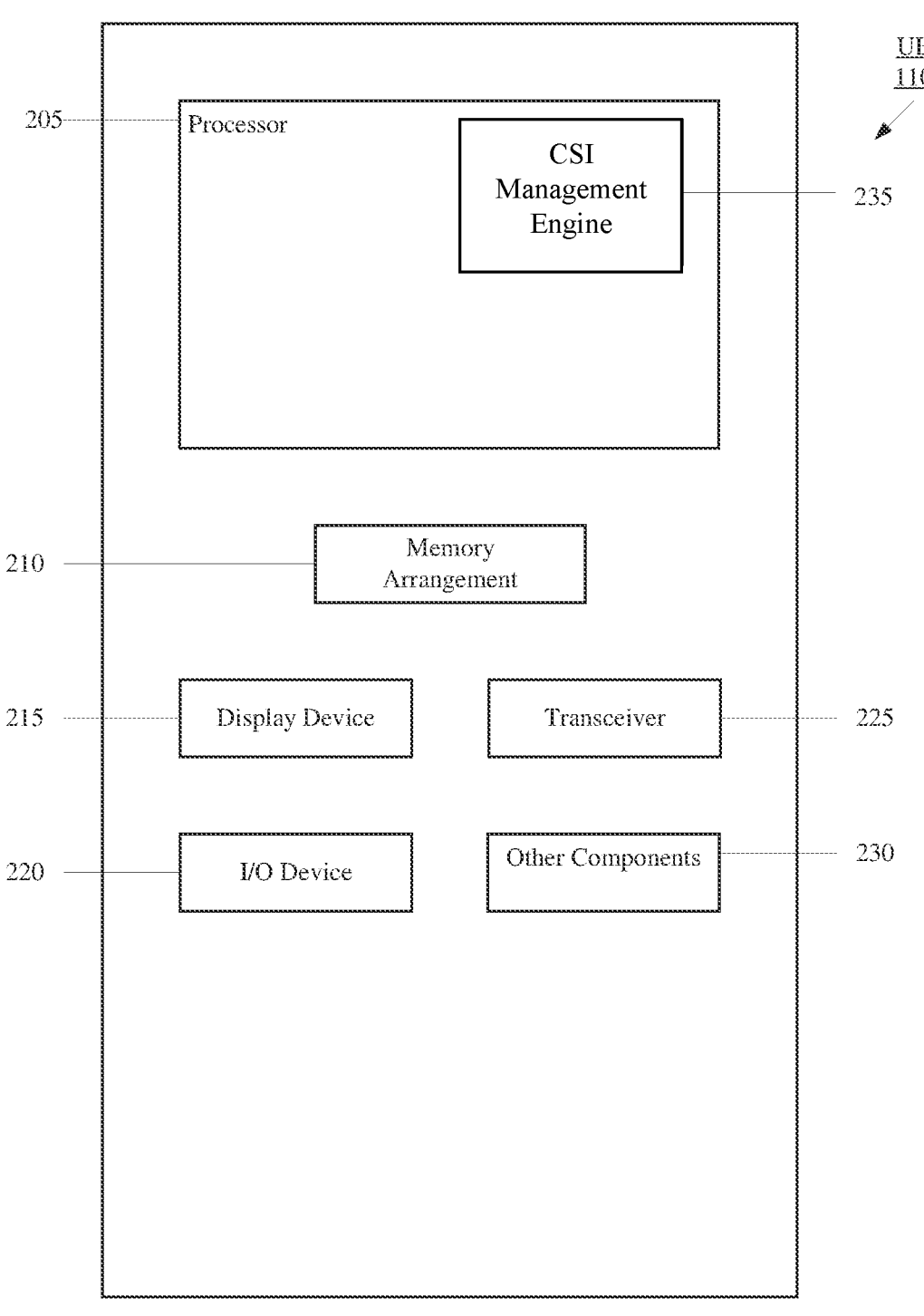
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a CSI management engine 235. The CSI management engine 235 may perform various operations related to reporting CSI capabilities of the UE 110 to the gNB 120a, processing CSI reports, and handling conflicts arising from PMI and rank restrictions. Examples of these processes will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
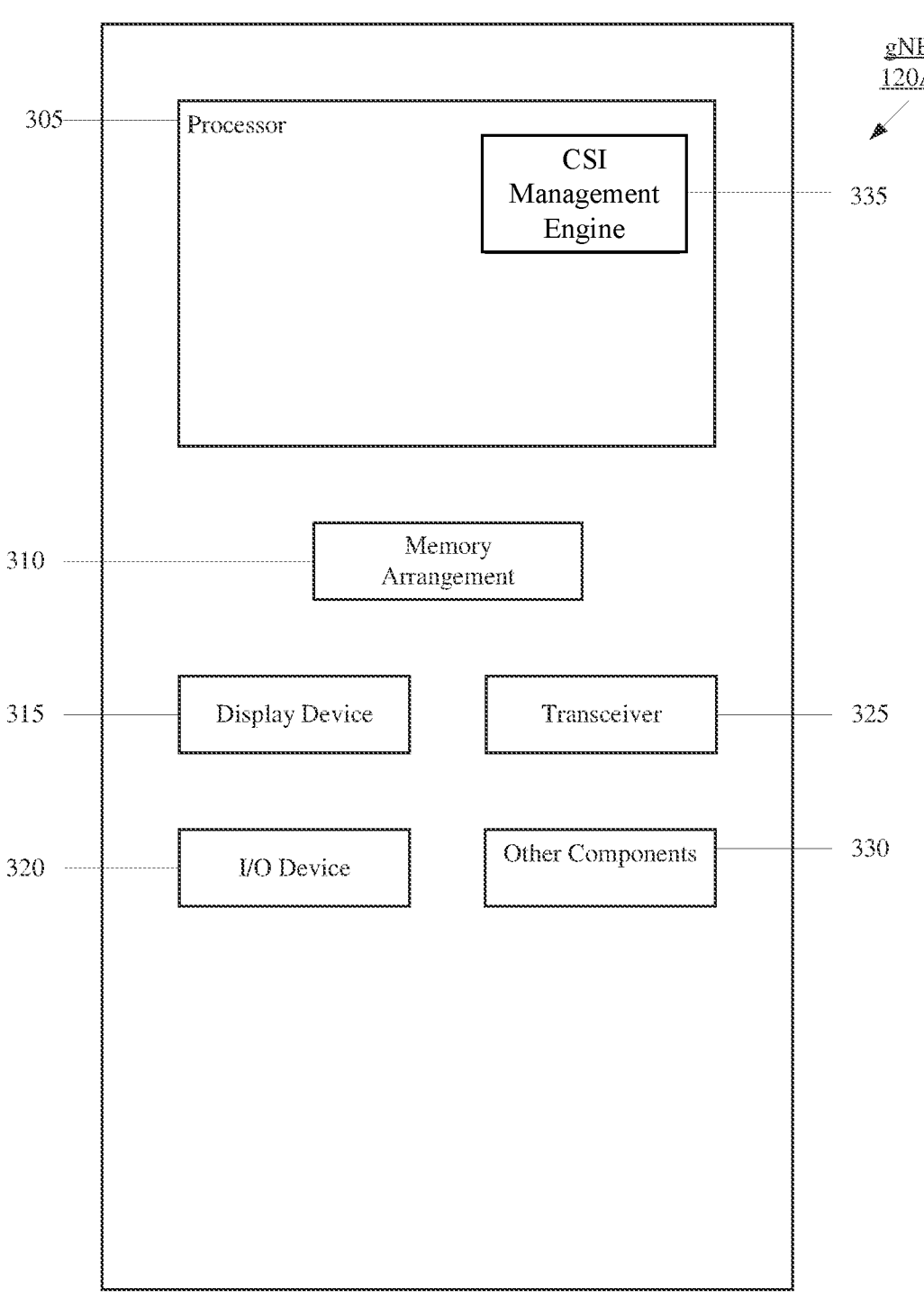
FIG. 3 shows an exemplary base station configured to establish a connection with a user equipment according to various exemplary embodiments.

FIG. 3 shows an exemplary network cell, in this case gNB 120A, according to various exemplary embodiments. The gNB 120A may represent any access node of the 5G NR network through which the UEs 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include a CSI management engine 335 for performing operations including configuring CSI reports for the UE 110 based on feedback from the UE 110. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figure 4:
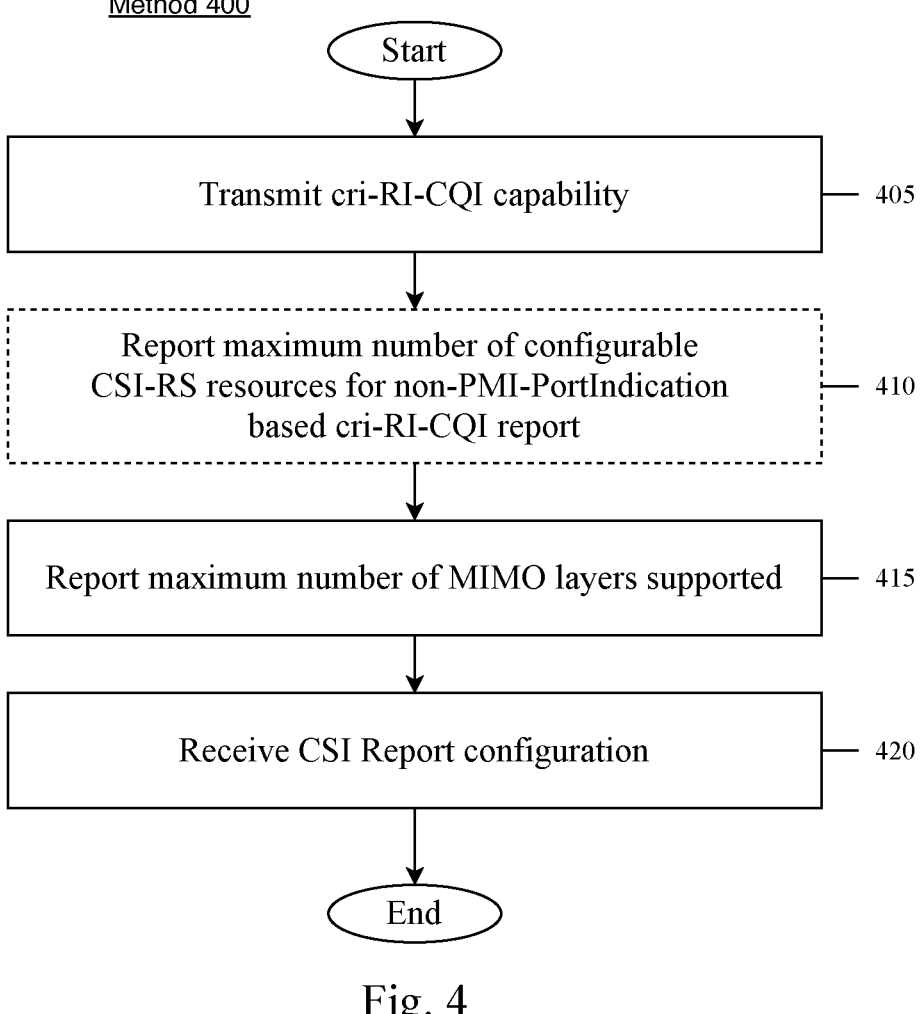
FIG. 4 shows a method of reporting the CSI capability of a UE according to various exemplary embodiments.

FIG. 4 shows a method 400 of reporting the CSI capability of the UE 110 according to various exemplary embodiments. At 405, the UE 110 transmits its cri-RI-CQI capability. In some embodiments, this capability includes two parameters. The first parameter is whether or not the UE 110 supports cri-RI-CQI reporting. If the UE 110 supports cri-RI-CQI reporting, the second parameter is whether or not the UE 110 additionally supports cri-RI-CQI with non-PMI-PortIndication reporting.

In some embodiments, if the UE 110 does not support cri-RI-CQI with non-PMI-PortIndication reporting, then to avoid a non-backwards compatibility (NBC) issue, the capability reporting of the UE 110 is modified to include a new csi-ReportWithoutPMI-r16 information element (IE) in addition to the existing csi-ReportWithoutPMI IE. The existing IE (csi-ReportWithoutPMI) indicates whether the UE 110 supports both types of cri-RI-CQI reporting (with or without non-PMI-PortIndication) to existing networks (Rel-15 networks). The newly added IE (csi-ReportWithoutPMI-r16) introduces the concept of not supporting cri-RI-CQI with non-PMI-PortIndication reporting but supporting cri-RI-CQI without non-PMI-PortIndication). As a result, if a UE 110 does not support cri-RI-CQI with non-PMI-PortIndication, the UE 110 would set the existing csi-ReportWithoutPMI IE to 0 since existing networks do not support the scenario where the UE 110 supports one type of report and not the other type of report. In contrast, for newer networks (Rel-16 networks), the UE 110 would set the csi-ReportWithoutPMI IE to 0 and the csi-ReportWithoutPMI-r16 IE to 1 to indicate that the UE 110 supports cri-RI-CQI without non-PMI-PortIndication. Additionally, another UE capability may be introduced for the UE 110 to indicate to the newer networks (e.g., Rel-16 networks), whether the UE 110 supports non-PMI-PortIndication.

Alternatively, if, at 405, the UE 110 indicates that it supports cri-RI-CQI with non-PMI-PortIndication reporting, then, in some embodiments, at 410, the UE 110 may additionally report the maximum number of CSI-RS resources that can be configured. As a result, the number of entries for PortIndexFor8Ranks in the RRC configuration of the cri-RI-CQI with non-PMI-PortIndication is reduced from the maxNrofNZP-CSI-RS-ResourcesPerConfig (e.g., 128) to the UE reported capability (the maximum number of CSI-RS resources that can be configured), thus reducing the overhead at the UE 110.

At 415, the UE 110 reports the maximum number of multi-in multi-out (MIMO) layers (ranks) supported by the UE 110 for cri-RI-CQI reporting. In some embodiments, the maximum number of ports that the gNB 120a can configure for each CSI-RS resource for the cri-RI-CQI report cannot exceed the maximum number of MIMO layers reported by the UE 110. The UE 110 may also report the maximum number of ports that can be configured per CSI-RS resource for the csi-RI-CQI measurement. For example, if the UE 110 reports that it supports a maximum of 4 MIMO layers, the gNB 120a cannot configure more than 4 CSI-RS ports for each CSI-RS resource for cri-RI-CQI reporting. In some embodiments, the gNB 120a may only configures up to the maximum number of MIMO layers in the PortIndexFor8Ranks IE. For example, assuming again that the UE reports that it supports a maximum of 4 MIMO layers, then the gNB 120a only configures up to rank 4, (e.g., rank1, rank2, rank3 and rank4) in the PortIndexFor8Ranks configuration. At 420, the UE 110 receives the CSI report configuration for the cri-RI-CQI report from the gNB 120a based on the capabilities the UE 110 has reported.

Figure 5A:
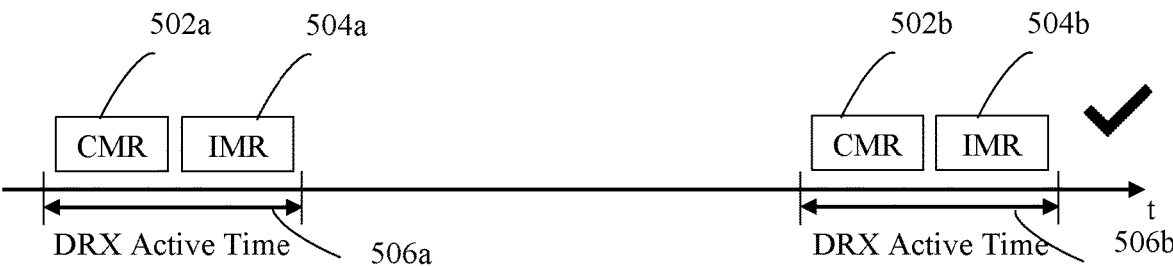
FIGS. 5A-5C shows exemplary diagrams illustrating reception of CSI resources in the time domain according to various exemplary embodiments.
Figure 5B:
Figure 5C:
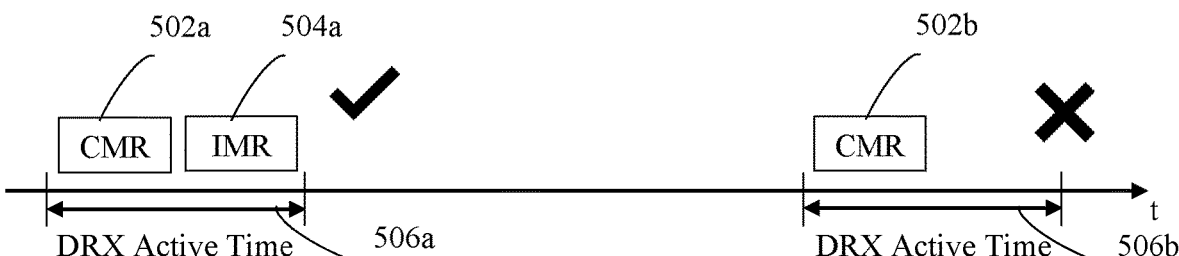

FIGS. 5A-5C shows exemplary diagrams illustrating reception of CSI resources in the time domain according to various exemplary embodiments. Discontinuous reception (DRX) allows the UE 110 to save power by repeatedly going into a sleep mode and subsequently an active mode, during which the UE 110 listens for any data sent from the gNB 120a. For CSI purposes, the UE 110 receives the CSI resources (CMR 502a,b and IMR 504a,b) during the DRX active time periods 506a,b. In some embodiments, to reduce overhead at the UE side, the gNB 120a may not expect the UE 110 to transmit a CSI report when the UE 110 receives a CMR 502*a* in a first DRX active time period 506*a* and an IMR 504*b* in a second DRX active time period 506*b*, as illustrated in FIG. 5B. As noted above, such a scenario requires the UE 110 to store the CMR (or IMR depending on which resource is received first) measurements until it receives the IMR 504 and performs the IMR measurements to complete the CSI report. By eliminating the need for the UE 110 to report the CSI in this scenario, the overhead at the UE 110 associated with the storing of the measured CMR is eliminated. To achieve this, the gNB 120*a* ensures that the CMR 502*a,b* and IMR 504*a,b* are always transmitted to the UE 110 in the same DRX active time period 506*a,b*.

In some embodiments, if the gNB 120*a* transmits a first CMR 502*a* and a first IMR 504*a* during a first DRX active time period 506*a* and just a second IMR 502*b* during a second DRX active time 506*b*, as illustrated in FIG. 5C, the UE 110 will only report the CSI for the measurements performed on the first CMR 502*a* and the first IMR 504*a*. This scenario may exist when, for example, one of the resources (e.g., the IMR) is not reported during every DRX active time period because it has not changed or has minimally changed since the last time the resource was reported.

As noted above, when the gNB 120*a* configures a twoTX-CodebookSubsetRestriction, as defined in 3GPP TS 38.214, and a typeI-SinglePanel-ri-Restriction, as defined in 3GPP TS 38.331, to restrict which precoding matrix indicator (PMI) can be selected by the UE 110 from the Rel-15 Type I Single Panel codebook defined in 3GPP TS 38.214, a conflict may arise between these two restrictions. In some embodiments, the UE 110 may honor both restriction methods. For example, if a PMI is prohibited by either one of the restriction methods, then the UE 110 will not report that PMI. In some embodiments, the UE 110 will alternatively ignore the typeI-SinglePanel-ri-Restriction. In some embodiments, the UE 110 will alternatively ignore the twoTX-CodebookSubsetRestriction. In some embodiments, however, the gNB 120*a* will only configure one of these restrictions so that the conflict never arises.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor configured to perform operations comprising:
    transmitting UE capabilities for channel state information (CSI) reporting to a base station, wherein the UE capabilities include a first type of CSI-RS-resource-indicator (CRI)-rank indicator (RI)-channel quality indicator (CQI) reporting capability and a second type of CRI-RI-CQI reporting capability,
    wherein the first type of CRI-RI-CQI reporting capability indicates whether the UE supports CRI-RI-CQI reporting,
    wherein the second type of CRI-RI-CQI reporting capability indicates whether the UE supports CRI-RI-CQI with non-precoding matrix indicator(PMI)-PortIndication; and
    receiving a CSI report configuration from the base station, wherein the CSI report configuration is based on the UE capabilities.

2. The processor of claim 1, wherein when the second type of CRI-RI-CQI reporting capability indicates that the UE supports the CRI-RI-CQI without non-precoding matrix indicator (PMI)-PortIndication and the base station is part of a first type of network, the processor is configured to report that the UE does not support CRI-RI-CQI reporting.

3. The processor of claim 1, wherein when the first type of CRI-RI-CQI reporting capability indicates the UE supports the CRI-RI-CQI reporting, the processor is configured to indicate whether the UE supports the CRI-RI-CQI with non-precoding matrix indicator (PMI)-PortIndication or CRI-RI-CQI without non-PMI-PortIndication.

4. The processor of claim 3, wherein when the processor indicates that the UE supports the CRI-RI-CQI with non-precoding matrix indicator (PMI)-PortIndication, the processor further indicates that the UE also supports CRI-RI-CQI without non-precoding matrix indicator (PMI)-PortIndication.

5. The processor of claim 3, wherein when the second type of CRI-RI-CQI reporting capability indicates the UE supports the CRI-RI-CQI with non-PMI-PortIndication, the processor is configured to indicate a maximum number of CSI-RS resources that may be configured for the CRI-RI-CQI report.

6. The processor of claim 1, wherein the first type of CRI-RI-CQI reporting capability indicates a maximum number of multi-in multi-out (MIMO) layers for each CSI reference signal (CSI-RS) configured for a CRI-RI-CQI report.

7. The processor of claim 6, wherein a maximum number of ports that may be configured for each CSI-RS resource for the CRI-RI-CQI report cannot exceed the maximum number of MIMO layers.

8. The processor of claim 1, wherein the CSI report includes a PortIndexFor8Ranks information element (IE), and wherein the base station configures only up to the maximum number of MIMO layers for the PortIndexFor8Ranks IE.

9. An apparatus comprising processing circuitry configured to:

generate, for transmission to a base station, UE capabilities for channel state information (CSI) reporting, wherein the UE capabilities include a first type of CSI-RS-resource-indicator (CRI)-rank indicator (RI)-channel quality indicator (CQI) reporting capability and a second type of CRI-RI-CQI reporting capability, wherein the first type of CRI-RI-CQI reporting capability indicates whether the UE supports CRI-RI-CQI reporting, wherein the second type of CRI-RI-CQI reporting capability indicates whether the UE supports CRI-RI-CQI with non-precoding matrix indicator (PMI)-PortIndication;

and decode, from signaling received from the base station, a CSI report configuration from the base station, wherein the CSI report configuration is based on the UE capabilities.

10. The apparatus of claim 9, wherein when the second type of CRI-RI-CQI reporting capability indicates that the UE supports CRI-RI-CQI without non-precoding matrix indicator (PMI)-PortIndication and the base station is part of a first type of network, the processor is configured to report that the UE does not support CRI-RI-CQI reporting.

11. The apparatus of claim 9, wherein when the first type of CRI-RI-CQI reporting capability indicates the UE supports CRI-RI-CQI reporting, the processor is configured to indicate whether the UE supports CRI-RI-CQI with non-precoding matrix indicator (PMI)-PortIndication or CRI-RI-CQI without non-PMI-PortIndication.

12. The apparatus of claim 11, wherein when the processor indicates that the UE supports CRI-RI-CQI with non-precoding matrix indicator (PMI)-PortIndication, the processor further indicates that the UE also supports CRI-RI-CQI without non-precoding matrix indicator (PMI)-PortIndication.

13. The apparatus of claim 11, wherein when the second type of CRI-RI-CQI reporting capability indicates the UE supports CRI-RI-CQI with non-PMI-PortIndication, the processor is configured to indicate a maximum number of CSI-RS resources that may be configured for the CRI-RI-CQI report.

14. The apparatus of claim 9, wherein the first type of CRI-RI-CQI reporting capability indicates a maximum number of multi-in multi-out (MIMO) layers for each CSI reference signal (CSI-RS) configured for a CRI-RI-CQI report.

15. The apparatus of claim 14, wherein a maximum number of ports that may be configured for each CSI-RS resource for the CRI-RI-CQI report cannot exceed the maximum number of MIMO layers.

16. The apparatus of claim 9, wherein the CSI report includes a PortIndexFor8Ranks information element (IE), and wherein the base station configures only up to the maximum number of MIMO layers for the PortIndexFor8Ranks IE.

* * * * *